United States Patent
Klump et al.

(10) Patent No.: US 7,890,238 B2
(45) Date of Patent: Feb. 15, 2011

(54) METHOD FOR DETECTING DAMAGE IN THE SHIFT-CONTROL ACTUATOR OF AN AUTOMATED MANUAL TRANSMISSION

(75) Inventors: Markus Klump, Buehlertal (DE);
Stefan Winkelmann, Buehl (DE);
Marian Preisner, Buehl (DE);
Reinhard Berger, Buehl (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 934 days.

(21) Appl. No.: 11/791,143

(22) PCT Filed: Oct. 22, 2005

(86) PCT No.: PCT/DE2005/001893
§ 371 (c)(1),
(2), (4) Date: May 18, 2007

(87) PCT Pub. No.: WO2006/053512
PCT Pub. Date: May 26, 2006

(65) Prior Publication Data
US 2008/0004767 A1    Jan. 3, 2008

(30) Foreign Application Priority Data
Nov. 18, 2004    (DE)    ........ 10 2004 055 590

(51) Int. Cl.
*G06F 17/00*    (2006.01)
(52) U.S. Cl. .......... 701/62; 701/51
(58) Field of Classification Search .......... 701/29, 701/51, 62; 702/182–183; 714/100, 25
See application file for complete search history.

(56) References Cited

U.S. PATENT DOCUMENTS

| | | | |
|---|---|---|---|
| 5,582,558 A | 12/1996 | Palmeri et al. | |
| 6,992,453 B2* | 1/2006 | Yasui et al. | 318/560 |
| 7,037,237 B2* | 5/2006 | Sakamoto et al. | 477/77 |
| 7,231,844 B2* | 6/2007 | Yasui et al. | 74/335 |
| 2002/0058567 A1 | 5/2002 | Rogg | |
| 2002/0125094 A1 | 9/2002 | Zimmermann et al. | |

FOREIGN PATENT DOCUMENTS

| | | |
|---|---|---|
| DE | 101 04 099 A1 | 8/2001 |
| DE | 100 38 195 A1 | 2/2002 |

(Continued)

*Primary Examiner*—Yonel Beaulieu
(74) *Attorney, Agent, or Firm*—Davidson, Davidson & Kappel, LLC

(57) ABSTRACT

A method for diagnosing damage in the shift control actuator of an automated manual transmission, involving at least one of the following steps: (a) determining a shift control actuator is damaged if an actual period needed for synchronizing a gear differs from a nominal time period for synchronizing the gear; (b) moving a shift-control actuator to a limit stop after selection of a gear, and determining a shift-control actuator is damaged if the limit stop that has been reached is an internal limit stop of the shift-control actuator and not a gear transmission limit stop; (c) determining the shift-control actuator is damaged if an actual speed during the overlap phase is not within a speed range within which the engine speed is expected to lie during the overlap phase.

13 Claims, 3 Drawing Sheets

FOREIGN PATENT DOCUMENTS

| | | |
|---|---|---|
| DE | 101 37 590 A1 | 3/2002 |
| DE | 102 33 699 A1 | 2/2004 |
| EP | 0 688 977 A2 | 12/1995 |
| EP | 0 849 505 A2 | 6/1998 |
| WO | WO 00/73682 | 12/2000 |

* cited by examiner

METHOD FOR DETECTING DAMAGE IN THE SHIFT-CONTROL ACTUATOR OF AN AUTOMATED MANUAL TRANSMISSION

The present invention relates to a method for detecting damage in the shift-control actuator, for example damage to a shift finger or a gear, in an automated manual transmission, such as in a parallel manual transmission, for example a parallel shift gearbox (PSG), without having to test the components themselves, i.e., before other components are degraded by the damage to individual components of the shift-control actuator.

BACKGROUND

Due to safety considerations, it is beneficial for defects in the shift-control actuator to be recognized in every possible driving state, and preferably at a point in time early enough, for example, to prevent overlap shifting into incorrect gears that had been erroneously selected due to the defect. To this end, it is intended to ascertain the presence of a defect in the shift-control actuator on the basis of parameters acquired by the automated manual transmission, preferably before an erroneous overlap shifting occurs.

SUMMARY OF THE INVENTION

Accordingly, it is an object of the present invention to devise a method for determining that damage exists in the shift-control actuator of an automated manual transmission that may be used for detecting damage in the shift-control actuator at an early point in time and during different driving states of the vehicle.

A method for detecting damage in the shift-control actuator of an automated manual transmission includes at least one of the steps:
  (a) determining an actual time period required for synchronizing a gear; comparing the actual time period to a nominal time period for synchronizing the gear, and determining whether damage is present in the shift-control actuator, the existence of damage being assumed when the actual time period deviates from the nominal time period; and/or
  (b) moving a shift-control actuator up to a limit stop following engagement of a gear, ascertaining whether the righthand limit stop is an internal limit stop of the shift-control actuator or whether it is a limit stop of the gear transmission, and establishing whether damage exists in the shift-control actuator, the existence of damage being assumed when the limit stop reached is an internal limit stop of the shift-control actuator; and/or
  (c) ascertaining an actual engine speed during the overlap phase and comparing the actual speed to a speed range within which the engine speed is expected during the overlap phase, and determining whether damage exists in the shift-control actuator, the existence of damage being assumed when the actual speed is not within the range that includes the expected speed.

The present invention may utilize the synchronization monitoring provided in automated manual transmissions, respectively evaluations of parameters acquired for the transmission shift control, to detect breaks in the shift-control actuator. In the context of the synchronization monitoring process, various parameters are recorded, which are properly evaluated in order to ascertain the presence of damage in the shift-control actuator, or at least to determine that there is an increased probability of damage existing in the shift-control actuator. To this end, the present invention provides, for example, that the time period required for synchronizing a gear be evaluated. Since this time period is defined in the context of the synchronization monitoring, in order, as the case may be, to begin or complete the synchronization process, there is no need to undertake any additional storing of parameters to establish whether damage exists in the shift-control actuator of a manual transmission.

Alternatively or additionally to evaluating the parameters for synchronization monitoring of the limit stop of the gear transmission, the present invention provides for monitoring the distance traveled up to the limit stop of the shift-control actuator, for example. This distance traveled between a neutral position and a limit stop of the shift-control actuator, for example of a shift finger, may also be determined in the context of controlling an automated manual transmission and merely needs to be appropriately evaluated for the method according to the present invention.

Finally, the speed during the overlap phase may be additionally or alternatively monitored as an additional parameter, from which damage to an element of the shift-control actuator may be inferred, at least when an incorrect gear, i.e., not the target gear, has already been preselected. This is possible, in particular, when in the case of a gearshift operation from a higher initial gear into a lower target gear, a gear is erroneously preselected which is higher than the initial gear, or, conversely, when a gearshift operation is carried out from a lower initial gear into a higher target gear, a gear is preselected which is lower than the initial gear.

The present invention allows conclusions to be drawn regarding the existence of damage in the shift control actuator on the basis of already existing parameters, namely alternatively or in combination, the time period required for synchronizing one gear, the path of motion of one shift-control actuator, and/or the actual speed of the engine during the overlap phase.

Preferably, damage is assumed only when it its existence is ascertained at any one time using at least two of the mentioned methods, preferably at least steps (a) and (c) or steps (b) and (c).

Steps (a), (b) and (c) are preferably carried out sequentially, in this order.

In accordance with one preferred specific embodiment, in step (a), the time period required for the actual synchronization process is determined and compared during the synchronization, and remains out of consideration for a time elapsing between the start-up of the synchronization process to the beginning of the actual synchronization. The nominal time period of the synchronization process is preferably ascertained in step (a) from a characteristic map in which it is stored as a function of one or more of the following parameters: synchronization force, output speed, transmission ratio, type of gearshift control.

In addition, in step (a), it is preferably determined which criterion is used by the synchronization control to initiate the actual synchronization process and which criterion is used to complete the actual synchronization process, and the existence of damage in the shift-control actuator is ascertained, when, in addition to the deviation of the actual time period from the nominal time period in accordance with step (a), the distance traveled by the shift-control actuator is used as a criterion both for initiating, as well as for completing the actual synchronization process.

In addition, the method preferably includes the step of activating and deactivating the method for establishing the existence of damage as a function of the vehicle's driving state.

In this context, the method is preferably deactivated when the vehicle is at a standstill and/or during upshifting accompanied by small speed step changes and/or during downshifting accompanied by high forces or loads and small speed step changes. Moreover, the method is preferably activated when the vehicle is in motion and during upshifting accompanied by large speed step changes and/or during downshifting up to certain maximum forces. In this context, the maximum forces are preferably specified as a function of the speed step change.

In accordance with one preferred specific embodiment, the type of limit stop is determined in step (b) on the basis of differences in the distance traveled between the neutral state of the actuator and the state of the actuator at the limit stop.

In accordance with one preferred specific embodiment, in step (c), for a thrust gearshift operation, the speed range is defined by a maximum, negative speed change, and, for a traction gearshift operation, the speed range is defined by a maximum, positive speed change, it being required in the thrust gearshift operation that the actual engine speed not fall below the expected speed range and, in the traction gearshift operation, that the actual engine speed not exceed the expected speed range.

BRIEF DESCRIPTION OF THE DRAWINGS

The present invention is described exemplarily in the following with reference to the enclosed figures, which show.

DETAILED DESCRIPTION

To detect a possible break in the shift-control actuator, in particular in shift fingers or gears, in automated manual transmissions, the present invention provides for determining whether there is an increased probability of a damaged shift-control actuator on the basis of parameters which are mostly acquired through the use of software. To that end, at least one of three steps described in the following is performed during a gearshift operation or immediately subsequently thereto, and it is recorded whether there is an increased probability of damage or not. The three steps are preferably carried out in succession, in their time sequence, and a break in the shift-control actuator is ultimately assumed when a break is detected in all three monitoring operations, i.e., when an increased probability of a damaged shift-control actuator is ascertained in each of the three processes described in the following. If an increased probability of a damaged shift-control actuator is detected by only one or two of the steps mentioned, then an elevated warning stage is preferably recorded, for example using software, and a test is once again performed with the assistance of the next suitable gearshift operation, which is compared with the preceding gearshift operation that had triggered the elevated warning stage, making it possible to ascertain therefrom whether or not a break exists.

In accordance with the first step for determining the presence of a broken shift-control actuator, the length of time required for synchronizing a gear in an automated manual transmission is monitored. Since in the case of a broken or damaged shift-control actuator, the shift-control actuator (shift finger) travels that distance without stopping which, in a correct synchronization process, it travels with delays, the length of time measured for the distance differs from the normal synchronization time, given otherwise equivalent conditions, in particular given a comparable synchronization force and comparable speed step change. Thus, to ascertain whether there is damage to the shift-control actuator of an automated manual transmission, the synchronization time actually required must be compared to a nominal synchronization time appropriate for the synchronization force used and for the specified speed step change, i.e., to a minimum synchronization time that may be determined from corresponding characteristic maps.

Figure 1:
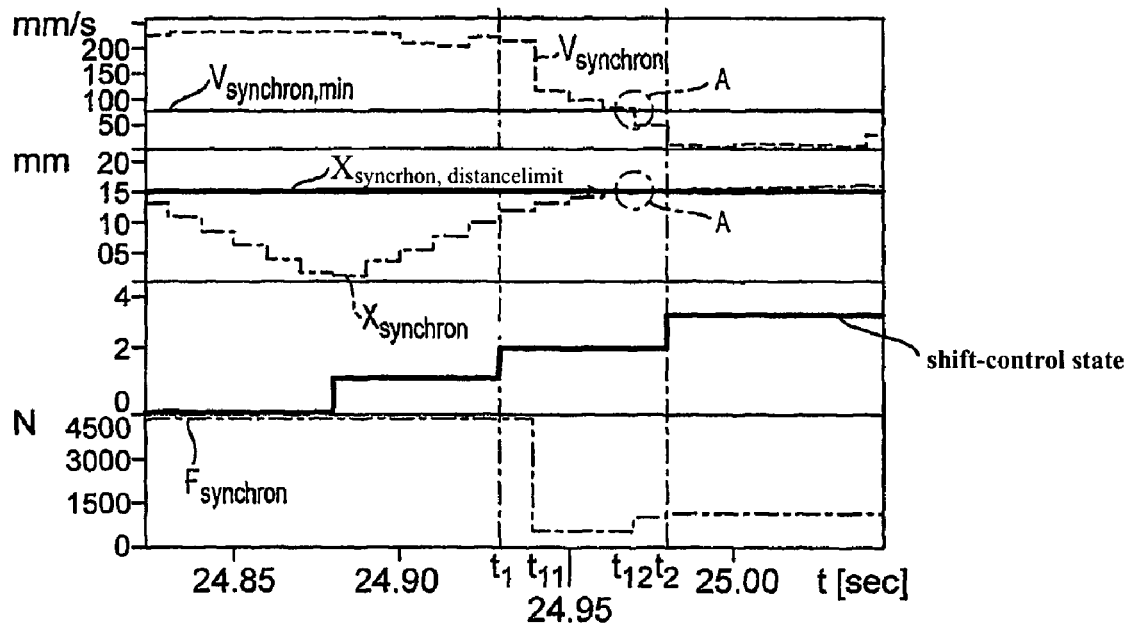
FIG. 1 characteristic maps of various parameters during a first phase of the synchronization.
Figure 2:
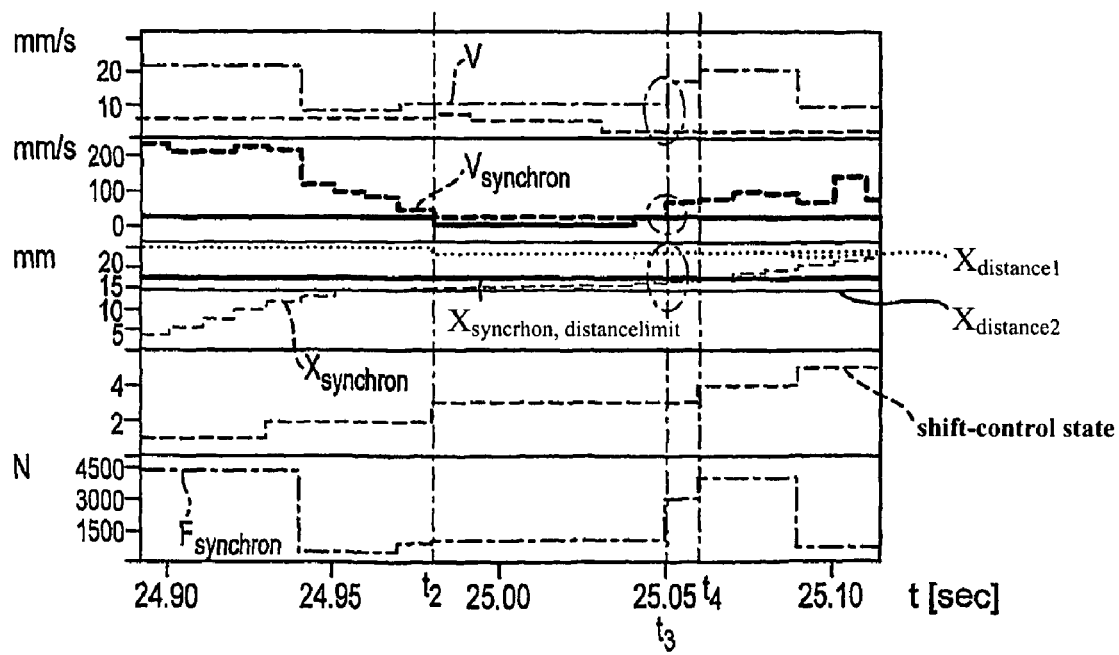
FIG. 2 characteristic maps of various parameters during a second phase of the synchronization.

In the case of an actual gearshift operation, in an automated manual transmission, for example in a parallel manual transmission, the synchronization process is subdivided into a plurality of stages, namely start-up of synchronization up to the actual synchronization process, the synchronization process up to completion thereof, and new gear engagement. FIGS. 1 and 2 illustrate the time characteristic of various parameters which are monitored during the synchronization process. In this context, FIG. 1 shows, in particular, the characteristic of synchronization velocity $v_{synchron}$, of synchronization force $F_{synchron}$, as well as of distance $x_{synchron}$ traveled by the shift finger between instants $t_1$ und $t_2$, which corresponds to the stage between start-up of synchronization and the beginning of actual synchronization process ($t_2$).

At the start of the synchronization process, the shift finger first travels at a synchronization velocity $v_{synchron}$ determined in advance from the characteristic maps, to approach synchronization, and is initially moved in a velocity-controlled mode. During this time ($t_1$ to $t_{11}$), synchronization force $F_{synchron}$ remains unchanged at a preset value. To continue to maintain synchronization velocity $v_{synchron}$ above a minimum value for synchronization velocity $v_{synchron, min}$, synchronization force $F_{synchron}$ is reduced during a second phase between $t_{11}$ and $t_{12}$.

As may be inferred from FIG. 1, the shift finger decelerates as soon as synchronization is achieved, i.e., as soon as synchronization velocity $v_{synchron}$ of the shift finger falls below a minimum value $v_{synchron, min}$ defined by the gear and force, or rebounds from the synchronization. In addition, as a safeguard to ensure that the synchronization is recognized, the position of the shift finger ($x_{synchron}$) may be compared to a set value $x_{synchron, distancelimit}$, making it possible, for example, for a transition to the next shift-control state at $t_2$ to also be initialized, in the case that the velocity criteria of the shift finger do not lead to recognition of the synchronization state. In the characteristic curve in FIG. 1, in response to $v_{synchron}$ reaching the velocity criterion, the transition to the next shift-control stage is triggered, i.e., the period between synchronization in process and completed synchronization, thereby initiating the actual synchronization process (circles A in FIG. 1). At this point in time, synchronization force $F_{synchron}$ is stepped up to a value defined by characteristic maps, the procedure optionally being carried out step by step, to ensure that a maximum increment and thus a maximum synchronization-force step change are not exceeded.

FIG. 2 shows the continuation of the characteristic curve of a synchronization process in which the actual synchronization is carried out. The synchronization is considered as complete at point in time $t_3$, when shift finger reaccelerates (increasing $v_{synchron}$). Gearshift speed $v_{synchron}$ must be greater than the speed ascertained from a characteristic map for completion of the synchronization operation, and the absolute value of gearshift travel $x_{synchron}$ must be smaller than at least a predefined distance limit $x_{limit1}$, $x_{limit2}$. The reacceleration of the shift finger is detected on the basis of various comparisons of the shift finger velocity, the time elapsed since the start of shift control, and the shift finger travel. Moreover, the end of this shift-control state ($t_3$) is likewise compared to an absolute distance criterion $x_{synchron,\ distancelimit}$. Thus, when the actuator travel has exceeded a predefined end position for the synchronization, the synchronization is considered to be complete, regardless of whether a reacceleration of the actuator was able to be detected. The shift-control state changes and the gear is engaged, to which end the synchronization force is increased to a maximum force constant (time period between $t_3$ and $t_4$).

To monitor or ascertain damage in the shift-control actuator, that length of time is preferably recorded which elapses between the initiation of the actual synchronization operation and its completion ($t_2$-$t_3$ or $t_2$-$t_4$). At the same time, a minimally expected state time between $t_2$-$t_3$ or $t_2$-$t_4$ is provided from a characteristic map. The more comprehensive the characteristic map is conceived, i.e., the greater the number of states stored, or the more parameters (speed, synchronization force, transmission ratio, differentiation between upshifting/downshifting) form the basis of the characteristic map, the greater the number of driving states in which a monitoring may be practically implemented in order to ascertain the existence of damage in the shift-control actuator on the basis of the time period required for synchronizing a gear. By comparing the value for the minimum state time retrieved from the characteristic map to the value for the actual state time, it is possible to assess whether a correct, i.e., damage-free gearshift operation was performed, or whether the actuator was traveling freely, unimpeded, i.e., that damage exists. A damage-free gearshift operation is assumed when the time actually elapsed is the state time retrieved from the characteristic map. Conversely, the existence of damage is deduced when the minimum state time from the characteristic map is fallen short of.

In addition, whether the gearshift operations described above were initiated in response to the distance criteria or in response to the speed criteria may be utilized as a further indication of damage. If the distance criteria are used, then there is an increased probability of damage existing in the shift-control actuator.

Figure 3:
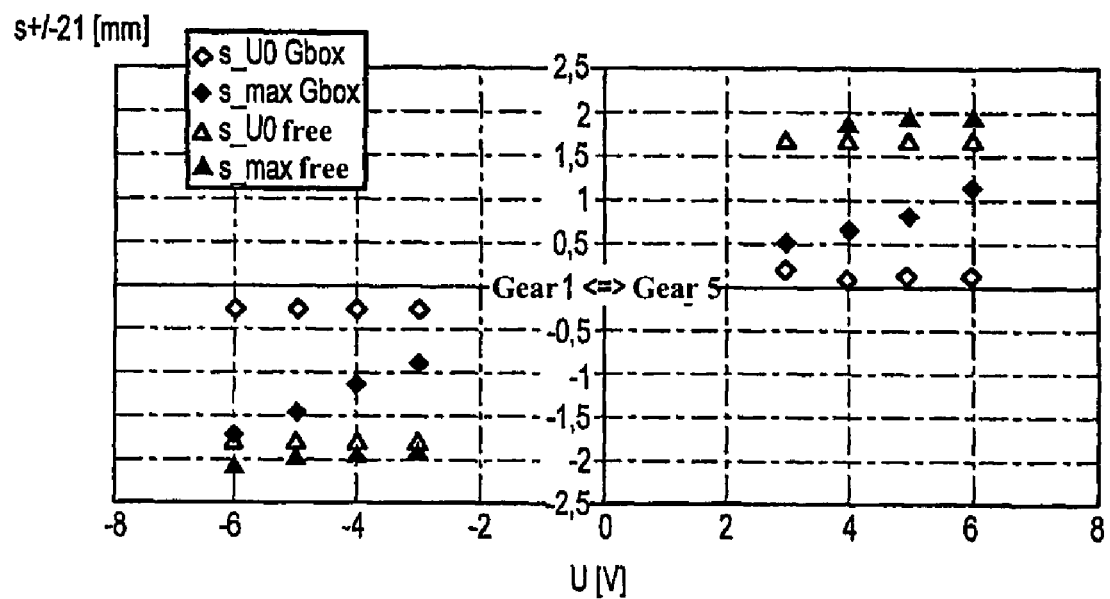
FIG. 3 characteristic maps of distances traveled by a shift-control actuator.

When an increased probability of damage existing in the shift-control actuator is ascertained and recorded in this first step, a second step is initiated which provides for monitoring the limit stops of the gear transmission. This second step may also be carried out independently of the first step. To that end, following each engagement of a gear, the shift-control actuator is driven further up to the limit stop of the gear transmission and is forced by positive pressure in the gear-shifting direction into the end position. This is illustrated in FIG. 3, a voltage in volts, which is used for applying positive pressure to the actuator, being plotted on the x-axis, and the distance traveled being plotted on the y-axis. The diamonds illustrate the travel characteristic for the undamaged state in which the shift fingers move against the gearshift rods, acting as limit stops, in the gear transmission. Triangular symbols in FIG. 3 illustrate the situation when, due to a broken shift-control actuator, the shift fingers are pressed against the internal limit stop of the actuator. In addition, filled-in symbols in FIG. 3 represent the maximum travel reached at any one time in response to corresponding positive-pressure voltage, and hollow symbols represent the position reached following release.

Figure 4:
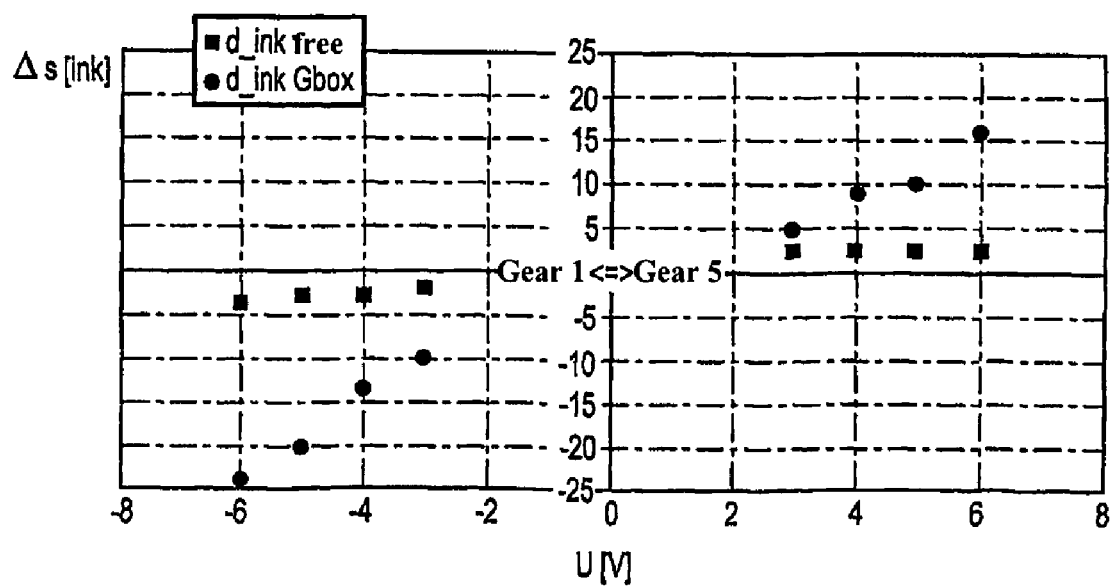
FIG. 4 an incremental representation of the distances illustrated in FIG. 3.

From FIG. 3, it is discernible that the gearshift rods (limit stops in the transmission) are softer than the internal limit stops in the actuator, so that, given moderate contact voltages, smaller distances are traveled before the limit stop is reached. Since, however, as is likewise discernible from FIG. 3, at high voltages, the difference in the absolute position between a damaged and undamaged limit stop in the gear transmission is small, to determine whether damage exists in the shift-control actuator of an automated manual transmission, the difference between the maximum distance reached and the released position is preferably evaluated. This is illustrated in FIG. 4, points representing the functioning, undamaged limit stop of the gear transmission and diamonds representing free limit stops, i.e., when the shift fingers are pressed against the internal limit stop of the actuator.

It is apparent from FIG. 4 that damage is deduced when the difference in the travel distance falls below a limit value, since it may then be assumed that the shift finger is running up against an internal limit stop. For that reason, immediately following completion of a gearshift operation, in which an increased probability of damage existing was ascertained on the basis of the synchronization, positive pressure is applied to the limit stop and an appropriate evaluation is performed.

In addition or alternatively to the two previously described processes, damage in the shift-control actuator of an automated manual transmission may also be deduced on the basis of a speed monitoring during the overlap phase. When there is a damaged shift-control actuator, the situation may arise where an incorrect gear is preselected and is not corrected or is not able to be corrected because of the damage. The earliest point in time when this is detectable is an overlap shifting or the point in time when the clutch of the preselected gear begins to transmit torque.

In a traction gearshift operation (from a lower to a higher gear), both input-shaft speeds are typically below the engine speed. Damage may then be determined on the basis of altered engine speed behavior when the input-shaft speed of the target shaft is greater than the engine speed, which occurs, for example, when the first gear is erroneously preselected instead of the third gear during a gearshift operation from the second into the third gear. This situation is illustrated in FIG. 5.

Figure 5:
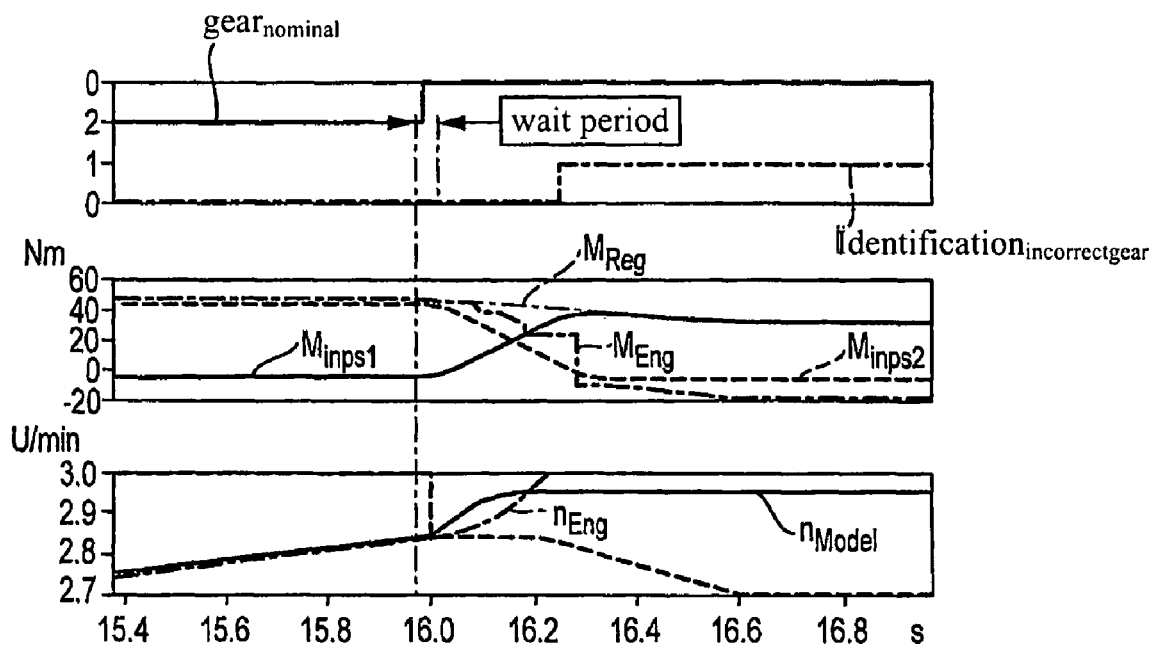
FIG. 5 selected parameters used in speed monitoring, for an upshifting in traction operation from the second into the third gear, in the case of an erroneously preselected first gear.

In FIG. 5, $gear_{nominal}$ denotes the shift-control state (gear characteristic) in the case of correct functioning, and identification$_{incorrect\ gear}$ the point in time when the incorrect gear is detected. In this context, "0" denotes a state during which the incorrect gear is not detected or is not detectable; "1" the state when the malfunction is detected. In the middle in FIG. 5, coupling torques are shown, $M_{reg}$ being the required clutch torque, $M_{eng}$ the engine torque and $M_{insp1}$ and, respectively, $M_{insp2}$ the coupling torques of the input shafts. It is clearly discernible from the third diagram in FIG. 5 that, in the case of a traction gearshift from the second into the third gear, when the first gear is erroneously preselected instead of the third gear, actual engine speed $n_{eng}$ exceeds expected speed $n_{model}$ in the course of the gearshift operation, namely when the erroneously preselected gear begins to transmit torque. Thus, in the case of a traction gearshift operation, damage in the shift-control actuator may be deduced when a range defined by calculated speed $n_{model}$ is exceeded by actual engine speed $n_{eng}$.

Figure 6:
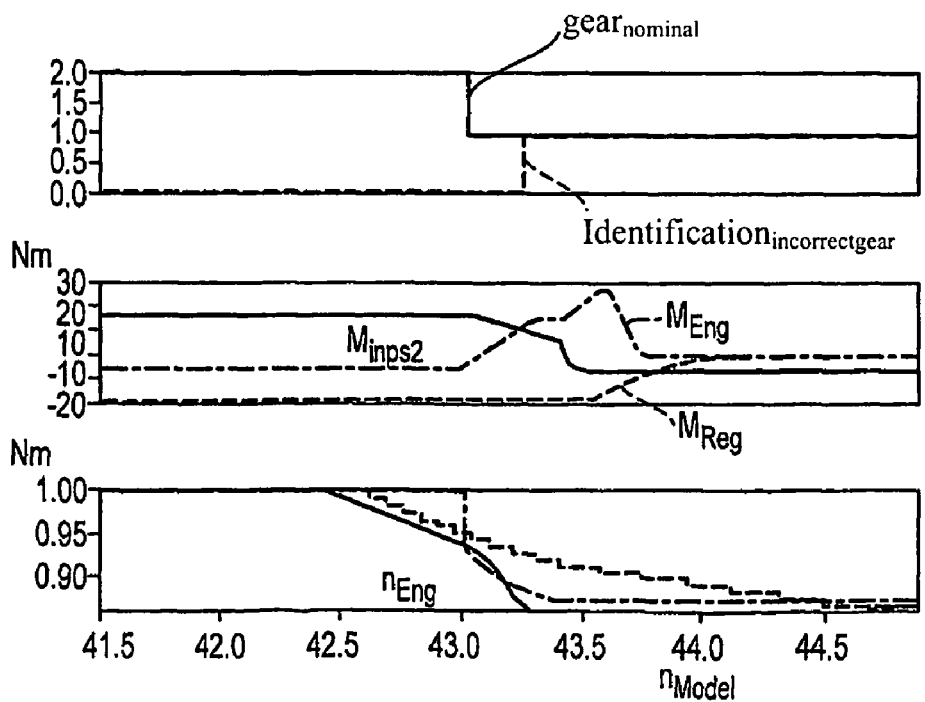
FIG. 6 corresponding parameters for a downshifting in thrust operation from the second into the first gear, in the case of an erroneously preselected third gear.

Using equivalent designations, FIG. 6 illustrates the process used for a thrust gearshift operation, for example a shifting from the second into the first gear (curve gear$_{nominal}$) when, instead of the first gear, the third gear is erroneously preselected. In this case, an error in the shift-control actuator is deduced (identification$_{incorrect\ gear}$) when actual engine speed n$_{eng}$ falls below the precalculated value in the case of the greatest permissible, accepted deviation for speed n$_{model}$.

In other cases when the erroneously preselected gear just so happens to result in the correct torque flowing to the clutch, for example because, coincidentally, the gear that has not been preselected or that has been incorrectly preselected is identical to the expected gear or is disposed in the same gear-shifting direction, it is then not possible for an incorrectly engaged gear to be detected by observing the engine speed during the overlap phase. When, for example, in a thrust gearshift operation from the fourth into the third gear, the first gear is engaged instead of the third gear, a detection is not possible.

For cases when a detection is possible, on the basis of the engine speed at the beginning of the overlap phase, a speed range is determined within which the speed change, respectively, the actual engine speed is expected. A maximum, negative speed change is defined for the thrust gearshift operation, the actual engine speed then being indicative of an error in the shift-control actuator when it is less than the calculated speed range. In the case of a traction gearshift operation, a maximum positive speed change is defined accordingly, so that an error is then deduced when the actual engine speed is higher than the speed that has been increased by the maximum positive speed change. Thus, to determine the speed range, the speed change may be calculated through variation of the torque errors with the aid of a maximum percentage deviation (Err=100±K_ErrorMax), that speed change which is the greatest in the particular case being used. The formula $$\Delta\omega = \frac{\Delta t \cdot \lfloor T_{eng} \cdot Err_{eng} - (sgn(\Delta n_1)T_{Cl1}Err_{Cl1} + sgn(\Delta n_2)T_{Cl2}Err_{Cl2})\rfloor}{J_{eng}} \quad (1)$$

may be used to calculate the speed change.

In this context, Err represents the torque error, T the moment of inertia of the engine, respectively of the first and second clutches, and n the corresponding speeds. J represents the planar moment of inertia of the engine.

To enable the transmission monitoring to be expediently carried out during as many driving states of the vehicle as possible, it is preferred that the monitoring be generally activated and that it merely be deactivated when it is not possible to reasonably establish the existence of damage because of the driving state. This is the case, for example, when the vehicle is at a standstill or during upshifting accompanied by small speed step changes. Downshifting operations at very high forces and small speed step changes are not suited for ascertaining damage to the shift-control actuator, particularly since, in these driving states, the synchronization times of a free-running actuator (damage) are not distinguishable from those of a functioning actuator that is integral in the transmission. On the other hand, a monitoring process is especially beneficial during downshifting operations given a traveling vehicle and forces which are below a maximum force. In this context, the maximum force is to be specified as a function of the speed step change. A monitoring operation is also possible during upshifting in the case of a vehicle in motion and large speed step changes.

Instead of generally activating the monitoring and merely excluding specific driving situations, the monitoring may alternatively be switched on only when the mentioned driving states suited for identifying a shift-control actuator error exist. Otherwise, it may remain in the deactivated state.

Instead of performing the various steps sequentially, namely ascertaining damage on the basis of the monitoring of the synchronization, on the basis of the monitoring of the limit stops of the gear transmission and/or on the basis of the speed monitoring during the overlap phase and, in particular, always initiating the next step when the preceding step suggests an error, it is also possible to use only one or two of the mentioned processes in any given combination, and, in the case that an increased probability of an error existing in the shift-control actuator is established, to wait for the next shift-control operation in order to verify the result in that operation using the same process. If, for example, a break has been detected by monitoring of the synchronization, in that a time comparison was carried out, and the state transitions have taken place in each case as a function of the distance criteria instead of the velocity criteria, then the result may be verified by a subsequent gearshift operation using a low synchronization force, preferably by a downshifting operation.

What is claimed is:

1. A method for detecting damage in-a shift-control actuator of an automated manual transmission, comprising at least one of the following steps:
   (a) determining an actual time period required for synchronizing a gear; comparing the actual time period to a nominal time period for synchronizing the gear, and determining whether damage is present in the shift-control actuator, the existence of damage being determined when the actual time period deviates from the nominal time period;
   (b) moving the shift-control actuator up to a limit stop following engagement of the gear or another gear; determining whether the limit stop reached is an internal limit stop of the shift-control actuator or a limit stop of a gear transmission; and establishing whether damage exists in the shift-control actuator, the existence of damage being determined when the limit stop reached is an internal limit stop of the shift-control actuator; and
   (c) determining an actual engine speed during an overlap phase comparing the actual engine speed to a speed range within which the engine speed is expected during the overlap phase, and determining whether damage exists in the shift-control actuator, the existence of damage being determined when the actual speed is not within the range that includes the expected speed.

2. The method as recited in claim 1 wherein damage is determined when the damage existence is ascertained at any one time by steps (a) and (c) or by steps (b) and (c).

3. The method as recited in claim 1 wherein steps (a), (b) and (c) are carried out sequentially.

4. The method as recited in claim 3 wherein step (b) or (c) is executed when damage was deduced in the step (a) executing step (b) or damage was deduced in step (b) executing step (c).

5. The method as recited in claim 1 wherein in step (a), the time period required for the actual synchronization process is determined and compared during the synchronization, and remains out of consideration for a time elapsing between the start-up of the synchronization process to the beginning of the actual synchronization process.

6. The method as recited in claim 1 wherein in step (a), the nominal time period is determined from a characteristic map stored as a function of one or more of the following parameters: synchronization force, output speed, transmission ratio, type of gearshift control.

7. The method as recited claim 1 wherein step (a) further comprises criterion used by a synchronization control of the automated manual transmission to initiate the actual synchronization process and to complete the actual synchronization process, the criterion used to determine the existence of damage in the shift-control actuator includes the deviation of the actual time period from the nominal time period and the distance traveled by the shift-control actuator.

8. The method as recited in claim 7 further comprising a step of activating and deactivating the method for establishing the existence of damage as a function of the vehicle's driving state.

9. The method as recited in claim 8 wherein the method is deactivated when the vehicle is at a standstill or during upshifting accompanied by small speed step changes or during downshifting accompanied by high forces or loads and small speed step changes.

10. The method as recited in claim 8 wherein the method is activated when the vehicle is in motion and during upshifting accompanied by large speed step changes or during downshifting up to certain maximum forces or loads.

11. The method as recited in claim 10 wherein the maximum forces or loads are specified as a function of the speed step change.

12. The method as recited in claim 1 wherein in step (b), the type of limit stop is determined on the basis of differences in the distance traveled between the released state of the actuator and the state of the actuator at the limit stop.

13. The method as recited in claim 1 wherein in step (c), for a thrust gearshift operation, the speed range is defined by a maximum, negative speed change, and, for a traction gearshift operation, the speed range is defined by a maximum, positive speed change, it being required in the thrust gearshift operation that the actual engine speed not fall below the speed range and, in the traction gearshift operation, that the actual engine speed not exceed the speed range.

\* \* \* \* \*